T. S. MILLER.
LOAD TRANSFER APPARATUS.
APPLICATION FILED MAY 12, 1914.

1,193,587.

Patented Aug. 8, 1916.
6 SHEETS—SHEET 1.

T. S. MILLER.
LOAD TRANSFER APPARATUS.
APPLICATION FILED MAY 12, 1914.

1,193,587.

Patented Aug. 8, 1916.
6 SHEETS—SHEET 3.

Witnesses:

Inventor
Thomas Spencer Miller
By his Attorneys

UNITED STATES PATENT OFFICE.

THOMAS SPENCER MILLER, OF SOUTH ORANGE, NEW JERSEY.

LOAD-TRANSFER APPARATUS.

1,193,587. Specification of Letters Patent. Patented Aug. 8, 1916.

Application filed May 12, 1914. Serial No. 837,977.

*To all whom it may concern:*

Be it known that I, THOMAS SPENCER MILLER, a citizen of the United States, residing at South Orange, county of Essex, and State of New Jersey, have invented certain new and useful Improvements in Load-Transfer Apparatus, of which the following is a specification.

My invention relates to new and useful improvements in load transfer apparatus, and, while it may be constructed for use in transferring loads from one point to another on land, it is particularly adapted for use in connection with marine vessels, for transferring loads from one vessel to another, or to a wharf, or for loading the vessel.

The invention particularly relates to that type of load transfer including a rope system adapted to transfer a load from the hold of a vessel to a point outboard of the vessel, which rope system is arranged to operate in a direction transversely of the vessel from which the load is being taken.

The primary object of the invention is to provide a rope system of the type mentioned, with means whereby the direction of travel of the load may be regulated to take place in different lines transversely of a vessel; that is, so that the load may be moved in a direction at right angles to the keel of the vessel, or oblique thereto at any point which may be desired or necessary.

The invention consists in the improvements to be more fully described hereinafter, and the novelty of which will be pointed out and distinctly claimed.

I have fully and clearly illustrated my invention in the accompanying drawings, to be taken as a part of this specification, and wherein.

Figure 1:
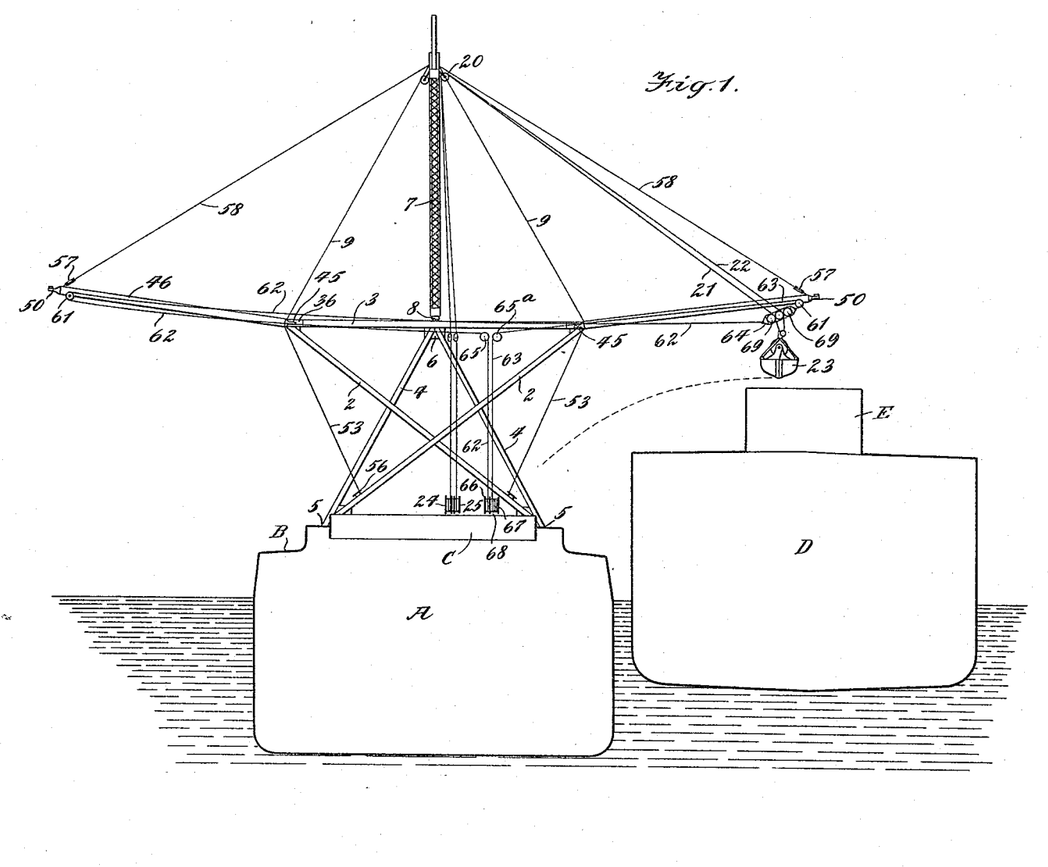
Figure 1 is a transverse vertical section through a vessel equipped with one embodiment of my invention, the latter being shown in front elevation, and in the act of delivering a load to another vessel at a point substantially amidships of the latter.
Figure 2:
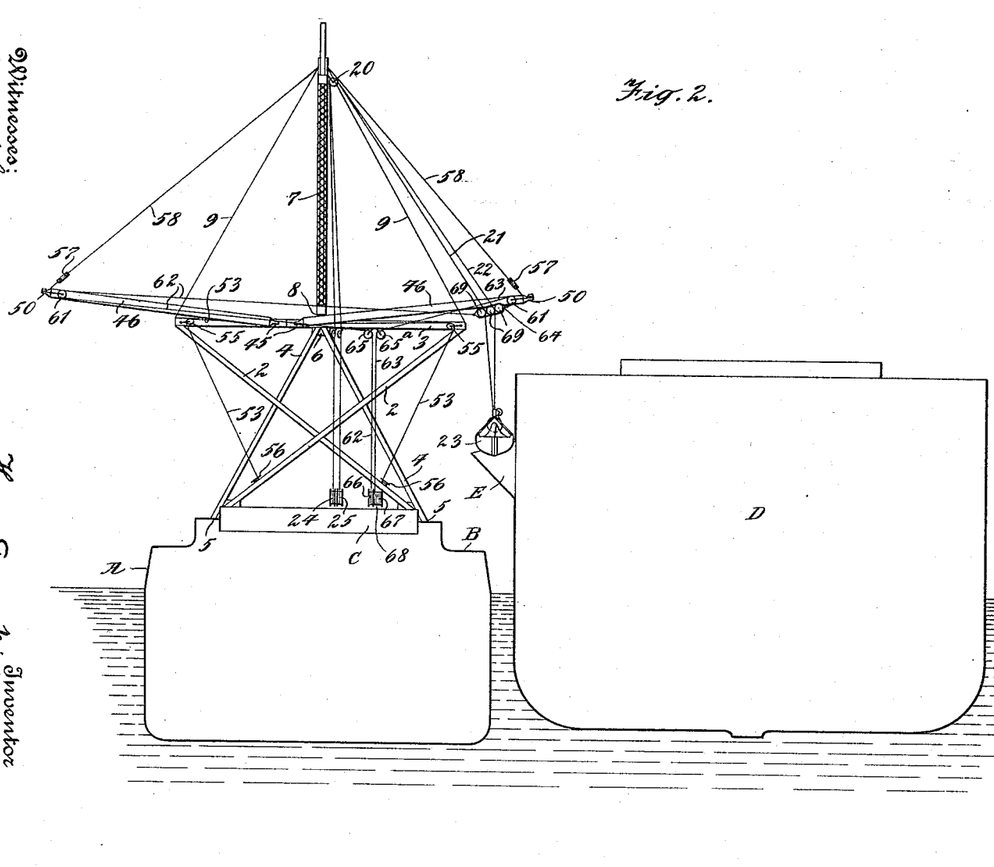
Fig. 2 is a view similar to that shown in Fig. 1 but showing the parts of the apparatus in another position of adjustment for depositing a load into a receptacle upon the side of another vessel.

Referring to the drawings by characters of reference, and particularly Figs. 1 and 2, A designates a marine vessel having a hold from which it is desired to dispense or unload material; for instance, such as coal, to another vessel, wharf or dock, the deck of the vessel A being shown at B, through which deck are one or more hatchways C, through which the material is passed in either loading or unloading the vessel A. The specific construction of this vessel A forms no part of my invention and may be varied widely without in any way affecting or limiting the scope thereof, and said vessel, therefore, as illustrated, is merely shown diagrammatically.

D designates a receiving station for the load, in this instance consisting of a second marine vessel, also shown in transverse vertical section, and adapted to receive the material dispensed or unloaded from the vessel A. The construction of this vessel D is immaterial as far as my invention is concerned, and is merely shown in order that the purpose and operation of my invention will be fully disclosed and understood. In Fig. 1 the vessel D may be provided with a chute E arranged amidships to receive the load, while in Fig. 2 the chute is shown on one side of the said vessel.

Figure 6:
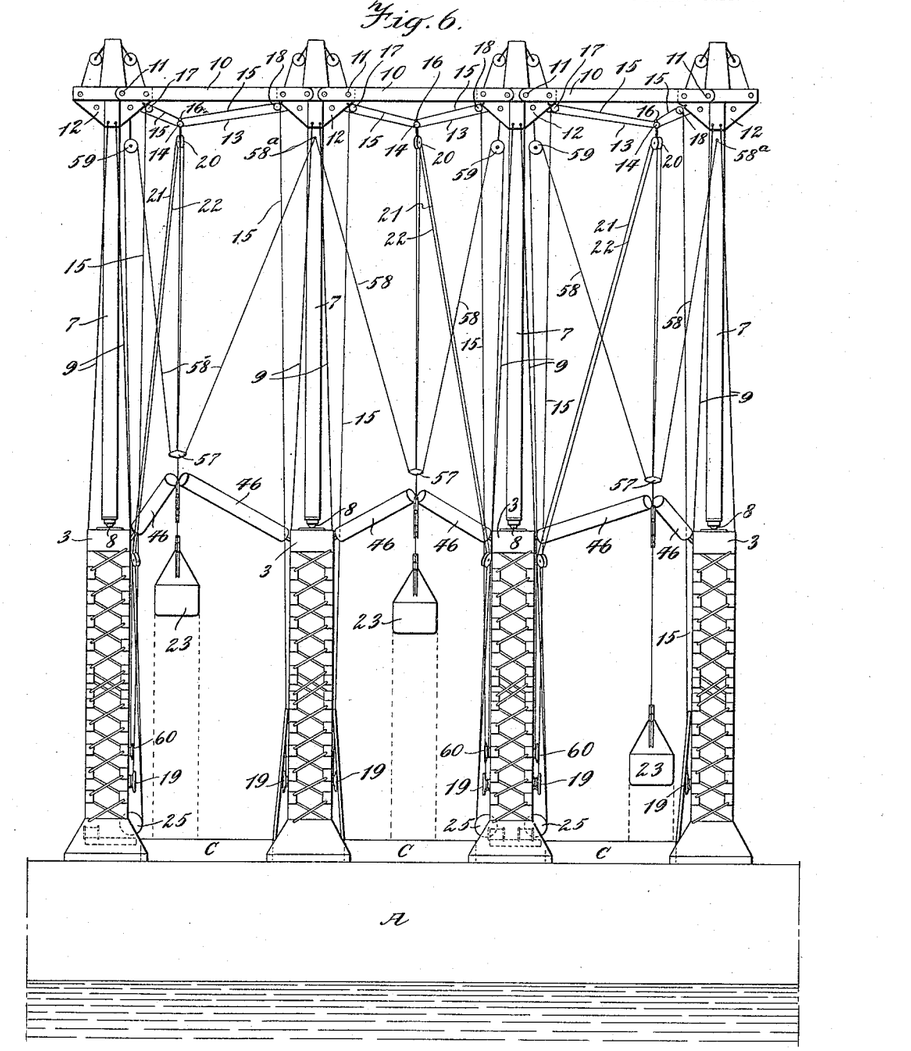
Fig. 6 is an enlarged detailed view showing the apparatus in side elevation and including an installation of three (3) rope systems.
Figure 7:
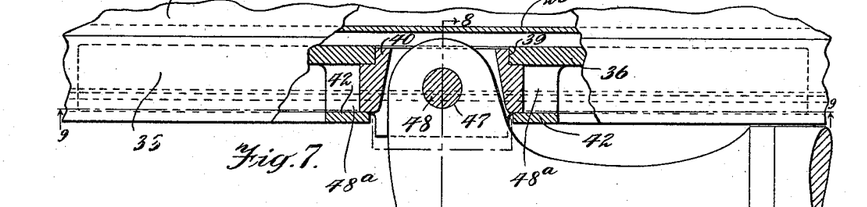
Fig. 7 is an enlarged detailed view partly in section of a pivotal and universal connection between the end of one of the booms employed and the structure for supporting the same.

Arranged on the deck B of the vessel A may be one or more elevated structures each preferably, although not necessarily, in the form of a tower, or a mastlike structure. Broadly considered, the specific construction of these towers or mastlike structures is immaterial to my invention, as long as they have proper design and sufficient rigidity and strength to serve the purpose for which they are employed. If desired, each of these towers may be in the form of a star frame consisting of inclined cross-girders 2 supporting at their upper ends a horizontal member 3 extending transversely of the vessel, said member 3 being braced and supported by inclined legs 4—4, having their lower ends anchored at the side portions of the vessel, as at 5, and inclined inwardly toward each other, their upper ends converging and being connected to said girder 3, as at 6. Rising from the center of the beam or girder 3 is a mast member 7, preferably having a pivotal connection at its lower end, as at 8, with said girder 3, said pivotal connection being preferably in the form of a universal joint, as, for instance, a ball-and-socket step-joint, so that the mast may not only be supported in vertical position, but may be adjusted to any angle which may be desired. The mast 7, when vertical, is supported against lateral movement by guys 9 running from the top of the mast to the outer ends of the beam 3. Where a plurality of these structures are employed, as shown in Fig. 6, the masts 7 may be, and preferably are, held against movement lengthwise of the vessel by means of tie rods 10 connected to the adjacent masts, as at 11.

Each mast 7 is preferably provided with a head 12, and having its ends supported by the heads of the adjacent masts is a cable-trackway 13 extending lengthwise of the vessel, said cable-trackways bridging the hatch space between the masts and located over the hatch or point where the load is to be taken. Mounted upon each of these cable-trackways 13 is a trolley or running-block 14 adapted to be moved lengthwise of said trackway 13 and held in adjusted position at the desired point over the hatchway. The running block may be adjusted and held by a variety of means within the intent and scope of my invention, but I provide traversing lines 15 connected to the said blocks, as at 16, and extending in opposite directions therefrom parallel to the trackway 13 and over blocks 17, 18, suspended respectively at the heads of the adjacent towers, said lines 15, 15, extending from said blocks downward to any convenient point, as, for instance, a cleat near the base of the mastlike structure, as at 19. It will be understood that, by taking up one of the lines 15 and paying out the other, the running block may be adjusted to the desired point on the trackway 13 over the hatchway, and that, by securing the lines 15, 15, against longitudinal movement, said running block will be held stationary in adjusted position.

Suspended from the running block 14 is a double sheave block 20 over which passes a hoisting rope fall, shown in this instance as comprising the holding and closing lines 21, 22, respectively, for an opening and closing bucket 23. These holding and closing lines run to drums 24, 25, respectively, of a hoisting engine, to be presently described, by means of which said lines are operated to cause the bucket to dig, close, hoist its load, and deposit the same at the desired point. While I have shown the fall constituted by the ropes 21 and 22 as consisting of holding and closing lines for a bucket, I desire it understood that my invention is not limited to such a fall, but is intended to include within its scope a fall constituted by a hoisting rope or ropes for lifting a load other than an opening and closing bucket.

It will be apparent from the above description that the hoisting rope fall depends, or is suspended, from the block 20, and is adapted to be swung freely from side to side along a path transversely of the vessel either at right angles to the keel or oblique thereto. I will now describe means for swinging the hoisting rope fall so as to transfer the load suspended thereby from the hatchway of the vessel to the outboard point of discharge, or from a point outboard to the vessel A, if the latter is to be loaded.

Figure 8:
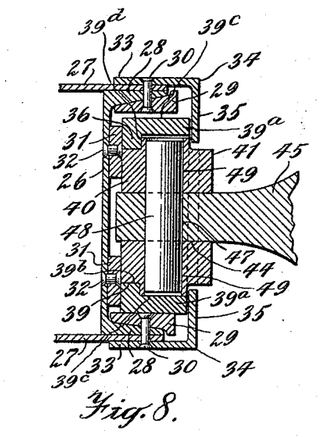
Fig. 8 is a section on the line 8—8 of Fig. 7.
Figure 9:
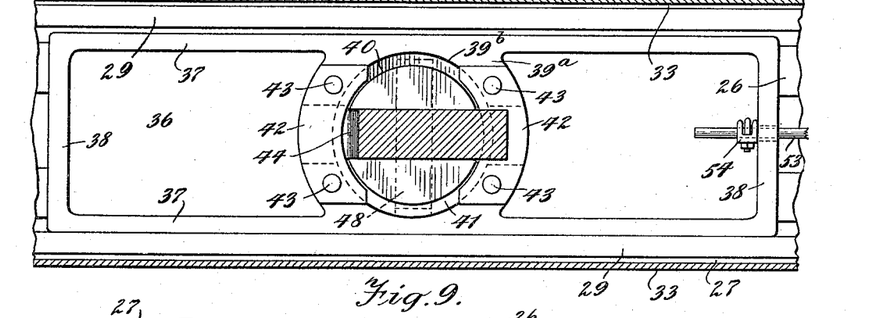
Fig. 9 is a section on the line 9—9 of Fig. 7.

The beams 3, heretofore described, preferably consist of channel irons 26 arranged in parallel vertical planes back to back, and connected by lattice bars or plates 27, one of said channel irons and the ends of the bars or plates 27 connected thereto being shown in Fig. 8 of the drawings. The flanges 28 of the channel irons 26 are each provided on their inner faces with a wear plate or strip 29 connected to said channel irons by countersunk rivets 30, and located on the body or web of each of the channel beams between the flanges 28 are wear or friction strips 31 parallel to each other and secured to the channel irons by countersunk rivets 32. Secured to the outer faces of each of the flanges 28 is one flange or member 33 of an angle iron 34, the other flange 35 of which projects inward, as at 35, beyond the wear plates 29, as clearly shown in Fig. 8 of the drawings. The channel beams 26 with their flanges 28 and plates 29 and the flanges 35 of the angle irons constitute a guideway to receive and guide the movements of a boom supporting member or connection, which will now be described. The preferred form of this member comprises a vertical plate 36 of a vertical width preferably greater than the width of the opening between the flanges 35, 35, of the angle irons, so that said plate may slide longitudinally of the guideway described, but is held against lateral displacement by the said flanges 35. This plate 36 is provided with longitudinal and end stiffening flanges 37, 38, the bottom longitudinal flange resting on and slidably engaging the lower plate 29 of the guideway, and the depth of the plate and flanges is preferably such that said member is substantially of a thickness equal to the distance between the strips 31 and the flanges 35, so that a substantial structure will be provided in which said connection member will travel lengthwise of the guide without wabbling or becoming bound or disarranged. It will be seen that the outer edges of the flanges 37 may travel in sliding contact with the inner faces of the flanges 29, and that the bottom flange 37 may slide in the bottom strip 29. Intermediate its ends the plate 36 is formed with a circular opening 39, surounded by an annular flange 39$^a$, one portion, 39$^b$ of said opening being of smaller diameter than the portion 39$^c$, thus forming a shoulder 39$^d$. This opening is adapted to receive a cylindrical block 41 having a circular portion 40 adapted to coöperate with the opening 39, and another circular portion 40$^b$ of greater diameter adapted to coöperate with opening 39$^b$, this block 41 serving as a journal turning in the opening 39, 39$^b$, as a bearing to provide for rotation on a horizontal axis. Circular retaining plates 42, 42, bolted to the front of the member 36 by bolts 43 overlap opposite edge portions of the block 41, thereby preventing dislodgment of said block in one direction, while the shoulder 39$^d$ prevents dislodgment in the opposite direction.

The block 41 is provided with a transverse slot or opening 44 to receive one end of a curved coupling head 45 to the opposite end of which is rigidly connected one end of a boom member 46. The end of the coupling head which enters said slot 44 is provided with a vertical opening 47 to receive a bearing pin 48, the opposite ends of which are seated and held in any suitable manner in openings 49 in the block 41 above and below said slot, the longitudinal axis of said pin extending at right angles to the axis of rotation of the block 41. The pin 48 is prevented from dislodgment by the flange 39$^a$. By this arrangement it will be seen that each boom is provided with a universal connection with its supporting mast structure, and the connection is movable transversely to different points relative to said structure. It will also be seen that, by adjusting said connection in the manner stated, the outer end of the boom may be moved inward and outward to different positions, according to where it is desired to carry or take a load. In order to disconnect the boom from its member 36, the outer end is lowered so that it hangs in a vertical position; the axis of the pin 48 will then be horizontal, and said pin may be driven out through the opening 48$^a$ in the flange 39$^a$ formed for this purpose.

Figure 10:
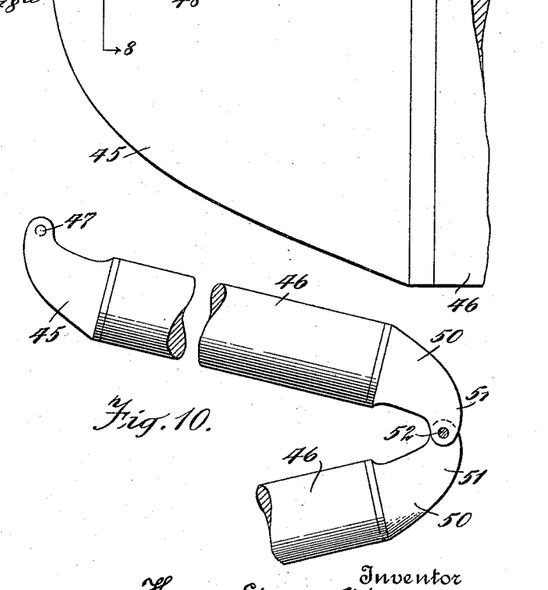
Fig. 10 is a detailed view of a connection between the ends of two of the booms.

In the preferred embodiment two sliding members 36 are arranged in each guideway on each mast, each member supporting a boom by a universal connection therewith, said booms extending in opposite directions from each other, and said sliding members being movable independently of each other so that both booms may be adjusted back and forth independently of each other. These two booms may serve as supports for a cableway, but I prefer to use them in combination with similar booms mounted on a next adjacent mast structure. In this preferred arrangement the booms which project in the same direction from two adjacent masts are connected at their outer ends, as clearly shown in Figs. 6 and 10, to provide an A-frame, the connection preferably being a loose or pivoted one, so that the ends of the booms may move relative to each other when the inner ends thereof are adjusted. For this purpose the outer end of each boom is provided with a coupling-head 50 having a curved extension 51, the curved extensions of two coöperating booms being overlapped and connected by a pivot pin 52.

Suitable means is provided for moving the sliding boom connections to the desired point and holding them at such point, which means may take a number of embodiments, but I prefer to connect to the outer end of each member one end of a line 53, the connection being shown at 54, said line extending from said member to and over a block or other guide 55 mounted on the end of the cross-beam 3, said line extending thence to a cleat 56 fixed at any convenient point, for instance, upon one of the masts. These lines 53 hold the connection members against inward movement, the outward movement of said members being prevented in a manner to be presently described.

The outer ends of each pair of booms have connected thereto a block, or other form of rope guide 57, through which extends a topping lift line 58, one end of which passes upward from said block and may be fixed at its end to the head 12 of one of the towers or masts, as shown at 58$^a$. The opposite end of said line 58 passes upward toward the upper end of the opposite tower from that having the point of connection 58$^a$, and passes over a block 59, whence it leads to any suitable point on the deck where it may be secured, as for instance, a cleat 60 mounted on one of the towers. It will be seen that these topping lift lines serve as supports for the outer ends of coöperating pairs of booms, so as to hold the same at the desired elevation.

I will now proceed to describe a means for swinging the hoisting rope fall to thereby transfer a load.

Supported by the outer ends of each pair of connected booms is a block or rope guide 61, over which pass traversing lines 62, 63, respectively, said lines being each connected at one end to a swinging frame 64, and their opposite ends being wound on drums 66, 67, of a hoisting engine 68, which will be presently described, said lines passing over guide pulleys 65, 65ª, on the mast structure.

This swinger frame 64 is provided with guide sheaves 69, between which pass the holding and closing lines 21, 22, heretofore described, for hoisting and operating the bucket, said swinger frame being adapted to be moved in a substantially horizontal line between the ends of one pair of booms, and the ends of the opposite pair of booms, to swing the bucket from the position at which it takes its load to the point where the load is to be dumped, for instance, from the hatch of the vessel A to the hatch of the other vessel.

Figure 11:
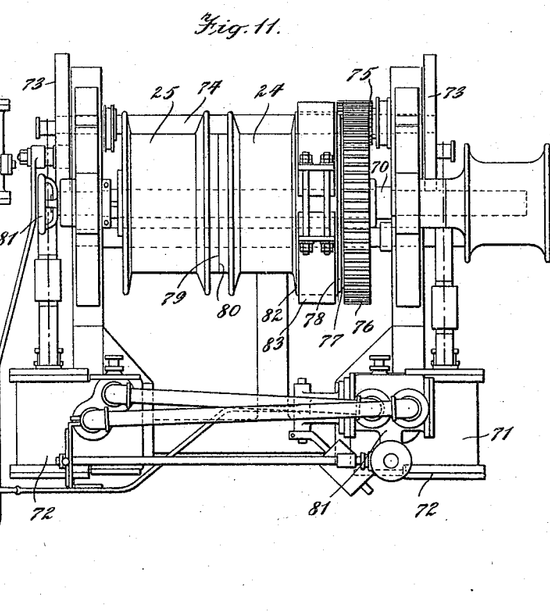
Fig. 11 is a plan view of an engine employed in connection with the invention.

The drums 24 and 25 (see Fig. 11) for operating the holding and closing lines, respectively, for the bucket are mounted preferably upon the same shaft 70, driven by any suitable motors, as, for instance, the steam engine 71, the latter including the cylinders 72 connected by the usual piston rods (not shown) with crank disks 73 mounted on the power shaft 74. The power shaft carries a pinion 75 meshing with the gear 76 mounted on the said shaft 70. The drum 24 for the holding line is free on the shaft 70, while the drum 25 is splined thereto to move longitudinally thereof but to turn therewith. The gear 76 is provided with the friction face 77 and the drum 24 at the end adjacent said gear with a friction face 78, while said drums at their adjacent or abutting ends are provided with friction faces 79, 80. Suitable thrust means 81 is provided for moving both said drums lengthwise of the shaft toward the gear 76, whereby driving contact is made between the faces 77, 78, and the faces 79, 80. By this arrangement the drum 25 for the closing line is positively driven from the shaft 70, while the drum 24 has a slipping driving connection with the said shaft. The steam engine for driving the drums is provided by a suitable reversing valve 81, by means of which the engine may be reversed to run the shaft 74 in opposite directions. The drum 24 is provided with a brake flange 82 with which coöperate a band brake 83 by means of which the rotation of the holding drum may be prevented or retarded.

Figure 12:
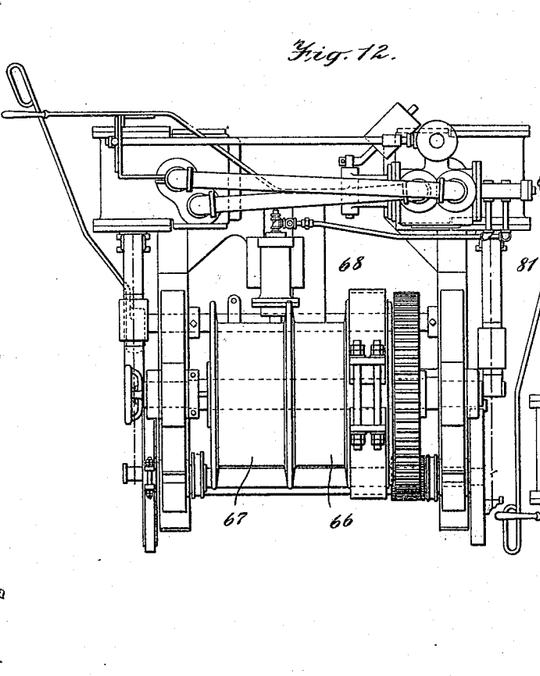
Fig. 12 is a plan view of another engine employed in connection with the invention.

The drums 66, 67, for the traversing lines 62 and 63, as shown in Fig. 12, may be constructed to operate on the same principle as the drums for the load operating lines, the drum for the line 63 being splined to the shaft and the drum for the line 62 free thereon, in the same manner as the drums 24 and 25, heretofore described. In view of the similarity of the engines shown, it is not deemed necessary to repeat for the traversing drum engine, the description given for the load operating engine.

I desire it understood that I do not confine my invention broadly to any particular type of rope system for hoisting and traversing the load, as I may employ that shown and described, or I may employ systems of other types, with or without a fall suspended from an elevated point. For instance, I may use such a cableway as is shown in my application for Letters Patent filed March 14, 1914, and serially numbered 824,590. I also do not limit myself to the exact forms of the engines employed, as my invention contemplates as being within its scope any drum engine which will accomplish the purpose, those shown being, I believe, the best adapted for the purpose.

The operation of the invention will now be described.

Figure 3:
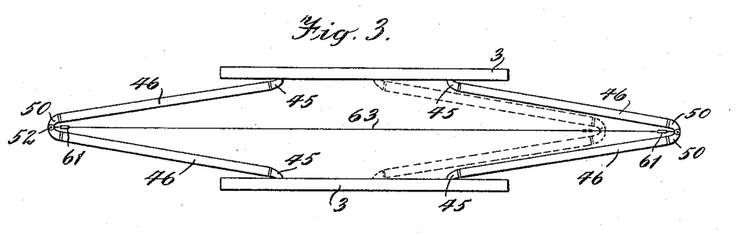
Fig. 3 is a diagrammatic plan view of the apparatus in condition to transfer a load in a direction centrally of a hatch.

If it is desired to take material from the central portion of the hatch and deliver it in a straight line at right angles to the longitudinal axis of the vessel to a point amidships of a receiving vessel, the booms are arranged as shown in Figs. 1 and 3. This is accomplished by operating the lines 53 to pull the boom connection members outward to the desired point, whereupon the ends of said lines are fixed to their cleats to prevent inward movement of the inner ends of the booms. No means is necessary to prevent outward movement of the boom connection members, as they are held against such movement by the pull exerted thereon by the load traversing lines 62 and 63 and by the topping lift 58. It will be understood that the boom connection members need not be adjusted to the extreme positions shown in Fig. 1, but may be placed farther inboard at any points desired; that is, they may be adjusted at substantially any point lengthwise of the members 3. With the bucket in the hold of the vessel slightly above the material to be transported, the operator holds the holding line drum 24 with the brake 83 and revolves the drum 25 to pay out the closing line, which results in the opening of the bucket. The operator then releases the holding line drum from its brake 83, thereby permitting the holding line to be paid out enough to permit the open bucket to drop on the pile of material. The operator then reverses the steam on the engine for the closing line drum to cause the latter to take up the closing line, which causes the bucket to be closed upon its load and lifted. The holding line drum is always in frictional engagement with the driving gear 76 and both lines operate to lift the load. When the bucket arrives at the swinger frame 64 the operator stops the engine for the holding and closing ropes, so that said drums may hold or pay out said ropes under power, as required. The operator then applies steam to the engine for the traversing lines to drive the outhaul drum to take up the line 63 and thereby haul the swinger frame 64 toward the outboard end of the boom located at the point of discharge. During this operation the drum for the inhaul line pays out the line 62 at the same speed as the line 63 is taken up. It will be understood that the lines 62, 63, are wound on their drums in opposite directions so that when one is paid out the other is taken up. When the bucket reaches a point over the point to receive the load the engine for the traversing rope drums is stopped, the brake is applied to the holding rope drum, and the engine is reversed to run the drum 25 to pay out the closing rope and permit the bucket to open and discharge its load. If the bucket is to be first lowered before being opened, the holding line drum is not held but runs with the closing line drum to pay out the holding line with the closing line. When the bucket reaches the desired point, the holding line drum may then be held by its brake and the closing line drum operated to pay out the closing line, as hitherto described. The load having been dumped, the closing line may be operated to close the bucket, and the holding line and closing line are then taken up to hoist the bucket to the swinger frame, whereupon the drums for the traversing lines 62, 63, are driven in the opposite direction from that when outhauling so that the line 62 is taken up and the line 63 is paid out, whereby the carriage may be inhauled to a point over the hatch, and the loading operation repeated.

It will be understood that the operation of the transfer or cableway is the same no matter to what positions the booms are adjusted, whether the position shown in Figs. 1, 2, 3, 4, 5 and 6, or other positions to which said booms may be moved.

When the load is to be dumped into a hopper at one side of the receiving ship the booms toward the receiving ship may be moved inward as shown in Fig. 2. When the load is to be operated in the direction shown in Fig. 3, the block 20 for the hoisting line fall is adjusted along the line 13 to a point substantially midway between the adjacent mast structures, so that the fall swings in a substantially vertical plane through the center of the hatch. This may also be the position of the block 20 when the parts are adjusted to the positions shown in full and dotted lines in Fig. 4. When it is desired to take the load from a point adjacent either the front or rear edge of the hatch and swing the load at right angles to the keel of the vessel, and the booms are adjusted to the position shown in Fig. 5, the lines 15 are then adjusted so as to move the block 20 toward the front or rear edge of the hatch according to the position where the load is to be taken.

While I have shown and described certain positions of the booms, it will be understood that they are not limited to these particular positions, but are capable of adjustment to other positions (not shown) permissible by the range of movement of the connecting members 36.

Figure 4:
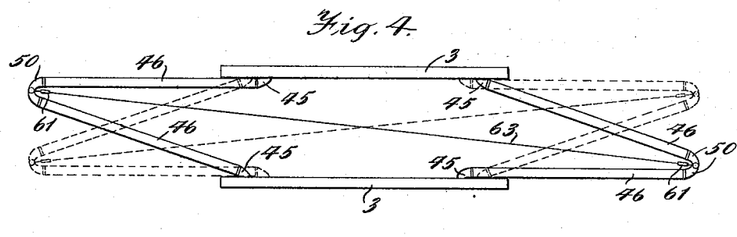
Fig. 4 is a diagrammatic plan view showing the apparatus in full lines in position for transferring the load in a direction obliquely of the hatch, and in dotted lines in position for transferring the load in an oblique line in the opposite direction from that shown in full lines.
Figure 5:
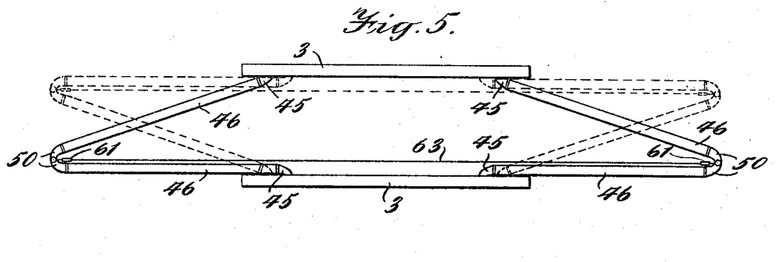
Fig. 5 is a diagrammatic plan view showing in full lines the apparatus in position for transferring the load in a line transversely of the hatch along one edge thereof, and in dotted lines along the opposite edge.

If desired the block 20 may be adjusted so as not to be in the same vertical plane as the blocks 61, 61, as shown in Figs. 4, 5 and 6, so that the load may be taken from any part of the hatch without regard to the location of the blocks 61, 61.

What I claim and desire to secure by Letters Patent of the United States is:—

1. A load transfer apparatus comprising a mastlike structure, two booms pivotally mounted on said structure, means whereby the pivots of said booms may be adjusted transversely of said structure, and a rope system supported at its ends by the two booms.

2. A load transfer apparatus comprising a mastlike structure, a member slidable transversely of said structure, a boom pivoted to said member, a second boom pivoted on said structure, and a rope system supported at its ends by the two booms.

3. A load transfer apparatus comprising a mastlike structure, a member slidable transversely of said structure, a boom having a universal connection with said member, a second boom mounted on said structure and a rope system supported at its ends by the two booms.

4. A load transfer apparatus comprising a mastlike structure, a boom pivoted on said structure, means for moving the pivot for said boom transversely of said structure, a second boom mounted on said structure, and a rope system supported at its ends on the two booms.

5. A load transfer, a mastlike structure, a guide on the mast, a member movable in said guide, a boom pivoted to said member, a support located on the opposite side of the mast from said boom, and a rope system supported by said boom and support.

6. A load transfer, a mastlike structure, a boom having a universal connection with said structure, means for adjusting said connection to different points transversely of said structure, a support on the opposite side of said structure from said boom, and a rope system supported at one end on said boom and at its opposite end on said support.

7. A load transfer, a mastlike structure, a guide on the said structure extending transversely thereof, a member movable lengthwise of said guide, a boom having a universal connection with said member, a support on the opposite side of the mast from said boom and a rope system supported at one end by said boom and at its opposite end on said support.

8. A load transfer apparatus comprising a mastlike structure, a guideway extending transversely of said structure, an endwise movable boom having one end traveling in said guideway, and a rope system having one end supported by said boom.

9. A load transfer apparatus comprising a mastlike structure, a guideway extending transversely of said structure, a member slidable lengthwise of said guideway, an endwise movable boom having one end connected to said member, and a rope system having one end supported by said boom.

10. A load transfer apparatus comprising a mastlike structure, a guideway extending transversely of said structure, a member slidable lengthwise of said guideway, an endwise movable boom having a universal connection at one end with said member, and a rope system having one end supported by said boom.

11. A load transfer apparatus comprising a mastlike structure, a guideway extending transversely of said structure, two booms each having one end slidable lengthwise of said guideway, and a rope system supported at its ends by the two booms.

12. A load transfer apparatus comprising a mastlike structure, a guideway extending transversely of said structure, two booms each having its inner end slidable lengthwise of said guideway, said booms being slidable independently of each other, and a rope system supported at its ends by the two booms.

13. A load transfer apparatus comprising a mastlike structure, a guideway extending transversely of said structure, two members movable independently of each other lengthwise of said guideways, two booms having universal connections with said members, respectively, and a rope system supported at its ends by the two booms.

14. A load transfer apparatus comprising two mastlike structures, each structure having a guideway extending transversely thereof, two booms having their inner ends slidable lengthwise of the respective guideways, and means for connecting the outer ends of said booms to each other.

15. A load transfer apparatus comprising two mastlike structures, each structure having a guideway extending transversely thereof, two booms each having its inner end slidable lengthwise of one of said guideways, respectively, means for connecting the outer ends of said booms to each other, a support on the opposite side of said structures from said booms, and a rope system supported by said booms and support.

16. A load transfer apparatus comprising two mastlike structures, a hoisting line fall suspended at a point between the upper end portions of said structures, means to adjust the point of suspension of said fall between said structures, a boom having one end supported on one of the said structures, means whereby the point of support for the boom may be located at various points transversely of the said structure, a support on the opposite sides of said structures from said boom, and fall swinging lines passing over said support and the boom.

17. A load transfer apparatus comprising two mastlike structures, a hoisting line fall suspended at a point between the upper end portions of said structures, means to adjust the point of suspension of said fall between said structures, two booms each having one end supported on one of said structures, respectively, means whereby the point of support for each boom may be located at various points transversely of the structure upon which it is mounted, a support on the opposite side of said structures from said booms, and fall swinging lines passing over said support and the said booms.

18. A load transfer apparatus comprising two mastlike structures, two booms fulcrumed on each structure and projecting in opposite directions therefrom, means whereby the fulcrum of each boom may be located at various points transversely of the structure supporting the same, and a rope system supported at its ends by the two booms.

19. A load transfer apparatus comprising two mastlike structures, two booms fulcrumed on each structure and projecting in opposite directions therefrom, means whereby the fulcrum of each boom may be located at various points transversely of the structure supporting the same, a hoisting rope fall supported from the upper end portions of said structures, and fall swinging lines supported by said booms.

20. A load transfer apparatus comprising two mastlike structures, two booms each having a universal connection with each structure and projecting in opposite directions therefrom, means whereby the universal connection for each boom may be located at various points transversely of the structure supporting the same without disturbing the position of the other universal connection, and a rope system supported at its ends by the two booms.

21. A load transfer apparatus comprising two mastlike structures, two booms each having a universal connection with each structure and projecting in opposite directions therefrom, means whereby the universal connection for each boom may be located at various points transversely of the structure supporting the same, means pivotally connecting the outer ends of said booms projecting on the same side of said structures, and a rope system supported by the free ends of said booms.

22. A load transfer apparatus comprising a mastlike structure, a boom, means for connecting said boom to said structure, means whereby said connecting means may be adjusted to different points transversely of said structure, a support located on the opposite side of said structure from said boom, and a rope system supported at one end by said boom and at its opposite end by said support.

23. A load transfer apparatus comprising mastlike structures, a boom, means for connecting said boom to one of said structures, means whereby said connecting means may be adjusted to different points transversely of said structure to which it is connected, a fall suspended from the upper end portions of said structures, and means for adjusting the position of the point of suspension of the fall between said structures.

24. A load transfer apparatus comprising mastlike structures, a boom, means for connecting said boom to one of said structures, means whereby said connecting means may be adjusted to different points transversely of said structure to which it is connected, a fall suspended from the upper end portions of said structures, means for adjusting the position of the point of suspension of the fall between said structures comprising a trackway suspended between said structures, a fall suspension block on said trackway, and rope means for moving said block along said trackway.

25. A load transfer apparatus comprising two mastlike structures, a hoisting line fall suspended at a point between the upper end portions of said structures, means to adjust the point of suspension of said fall between said structures, two booms each having one end supported on one of said structures, respectively, said booms being pivoted to each other at their outer ends, means whereby the point of support for each boom may be located at various points transversely of the structure upon which it is mounted, a support on the opposite side of said structures from said booms, and fall swinging lines passing over said support and the said booms.

26. A load transfer apparatus comprising a mastlike structure, a guideway extending transversely of said structure, two booms each having its inner end slidable lengthwise of said guideway, said booms being slidable independently of each other, means for pivotally connecting the booms to each other at their outer ends, and a rope system supported by said booms.

27. A load transfer apparatus comprising two mastlike structures each having a guideway extending transversely thereof, a member slidable along each guideway, a boom having a universal connection with each member, the outer ends of the booms being pivotally connected to each other.

28. A load transfer apparatus comprising two mastlike structures, each of said structures having a guideway extending transversely thereof, two oppositely extending booms having their inner ends slidable in one guideway, two oppositely extending booms having their inner ends slidable in the other guideway, and means for connecting the outer end of each of said booms on one structure with the outer end of the corresponding boom on the other structure.

29. A load transfer apparatus comprising a mastlike structure having a guideway extending transversely thereof, a member slidably disposed on said guideway, and having a circular opening, a bearing member rotatable on said opening, a pin on said bearing member at right angles to its axis of rotation, and a boom having its inner end pivoted on said pin.

In testimony whereof I have hereunto signed my name in the presence of two subscribing witnesses.

THOMAS SPENCER MILLER.

Witnesses:
Louis G. Ruggles,
Ernest Puleford.